United States Patent
Annanolli et al.

(10) Patent No.: US 7,207,750 B2
(45) Date of Patent: Apr. 24, 2007

(54) SUPPORT PAD FOR LONG HOLE DRILL

(75) Inventors: Raimo Annanolli, Sandviken (SE); Veronica Böstrom, Osterbybruk (SE)

(73) Assignee: Sandvik Intellectual Property AB, Sandviken (SE)

( * ) Notice: Subject to any disclaimer, the term of this patent is extended or adjusted under 35 U.S.C. 154(b) by 227 days.

(21) Appl. No.: 10/885,873

(22) Filed: Jul. 8, 2004

(65) Prior Publication Data

US 2005/0025928 A1    Feb. 3, 2005

(30) Foreign Application Priority Data

Jul. 16, 2003    (SE)    ................... 0302083

(51) Int. Cl.
*B23B 51/04*    (2006.01)

(52) U.S. Cl. ............ 408/83; 408/81; 428/472; 428/336; 428/698; 428/701; 428/702

(58) Field of Classification Search ........ 428/472, 428/469, 698, 701, 702, 336; 407/117, 119; 408/81, 83
See application file for complete search history.

(56) References Cited

U.S. PATENT DOCUMENTS

| | | | |
|---|---|---|---|
| 3,900,592 A * | 8/1975 | Kennedy et al. ............ 428/212 |
| 4,596,498 A | 6/1986 | Kress | |
| 4,984,940 A * | 1/1991 | Bryant et al. ............... 407/119 |
| 5,075,181 A * | 12/1991 | Quinto et al. ............... 428/698 |
| 5,697,737 A * | 12/1997 | Danielsson et al. ........... 408/83 |
| 5,871,850 A * | 2/1999 | Moriguchi et al. ......... 428/701 |
| 5,921,727 A | 7/1999 | Depperman | |
| 6,143,143 A | 11/2000 | Walls et al. | |
| 6,406,224 B1 | 6/2002 | Ostlund et al. | |
| 6,426,137 B1 * | 7/2002 | Oshika et al. .............. 428/336 |
| 6,682,275 B1 | 1/2004 | Lindblom et al. | |
| 6,733,874 B2 * | 5/2004 | Ueda et al. ................. 428/698 |

FOREIGN PATENT DOCUMENTS

EP    0 786 536 A1    7/1997

* cited by examiner

*Primary Examiner*—Archene Turner
(74) *Attorney, Agent, or Firm*—Drinker Biddle & Reath LLP

(57) ABSTRACT

Support pad for a long hole drill head wherein the support pad includes a base body with a bottom surface, at least one side surface and a top surface. The top surface is arranged to function as a wear surface and is defined by a titanium-free wear-resistant coating, whereas the remaining surfaces of the support pad are defined by a titanium-containing wear-resisting coating.

22 Claims, 3 Drawing Sheets

SUPPORT PAD FOR LONG HOLE DRILL

This application is based on and claims priority under 37 U.S.C. § 119 with respect to Swedish Application No. 0302083-1 filed on Jul. 16, 2003, the entire content of which is incorporated herein by reference.

BACKGROUND OF THE INVENTION

The present invention relates to a support pad for a long hole drill for metal machining with improved properties specially for STS (Single Tube System) system and for drilling tools based on the Ejector® system. The invention also relates to a tool head equipped with a support pad, as well as a method of fabricating such a support pad.

Drilling in metals is divided generally in two types: long hole drilling and short hole drilling. By short hole drilling is meant generally drilling to a depth of up to 3–5 times the drill diameter.

In short hole drilling, the demands are not great, enabling the use of simple helix drills formed either of solid cemented carbide or as solid tool steel or of tool steel provided with cemented carbide inserts.

Long hole drilling, however, puts large demands on good chip formation, lubrication, cooling and chip transport. This is achieved through specially developed drilling systems with specially designed drilling heads fastened to a drill rod and fulfilling the above mentioned demands. The drill head may be of solid cemented carbide but is generally of tool steel provided with a number of cutting inserts of cemented carbide placed in such a way that they together form the necessary cutting edge. In the center of the head, a tough grade of insert is generally used and on the periphery a more wear resistant one. The cutting inserts are brazed or mechanically clamped. Generally the cutting inserts are brazed on small-diameter drills and mechanically secured on larger-diameter drills. In addition, the head is provided with support pads.

Cutting inserts and support pads are made of cemented carbide with various contents of WC, Co and cubic carbides TiC, TaC, NbC depending on the application. Cutting inserts as well support pads are in addition coated with one or more wear resistant layers. Generally, the support pads are coated with a yellow layer of TiN. A long hole drill head with a geometrical configuration of inserts and support pads as outlined above is disclosed in U.S. Pat. No. 6,682,275 the disclosure of which is hereby incorporated by reference.

It is a primary purpose of the invention to provide a support pad and a long hole drill head in combination with such a support pad wherein the useful life and strength is substantially increased, especially when drilling in a titanium-based workpiece.

A second object of the invention is to provide an improved support head and long hole drill head having improved properties for the machining of heat resistant material, titanium based material and cast iron, as well as in the machining of nickel based alloys.

SUMMARY OF INVENTION

The objects of the present invention are realised by a support pad adapted for use on a long hole drill head. The support pad includes a bottom support surface, a top wear surface, and a peripheral surface disposed between the support surface and the wear surface. The support surface and the peripheral surface are defined by a titanium-containing wear-resistant coating. The wear surface is defined by a titanium-free wear-resistant coating.

Another aspect of the invention relates to a method of manufacturing a support pad for a long hole drill head. The support pad includes a bottom support surface, a top wear surface, and a peripheral surface disposed between the wear surface and the support surface. The method comprises the steps of:

A) applying a titanium-free wear-resistant coating completely around a substrate;

B) applying a titanium-containing wear-resistant coating entirely around the titanium free coating; and C) removing a top portion of the titanium-containing coating, wherein the bottom support surface and the peripheral surface are defined by the titanium-containing coating, and the top wear surfaces defined by the titanium free coating.

A further aspect of the invention relates to a long hole drill head which carries at least one support pad of the type defined above.

BRIEF DESCRIPTION OF DRAWINGS

Below follows an embodiment of the invention described with reference to the enclosed drawings.

DESCRIPTION OF A PREFERRED EMBODIMENT OF THE INVENTION

Figure 1:
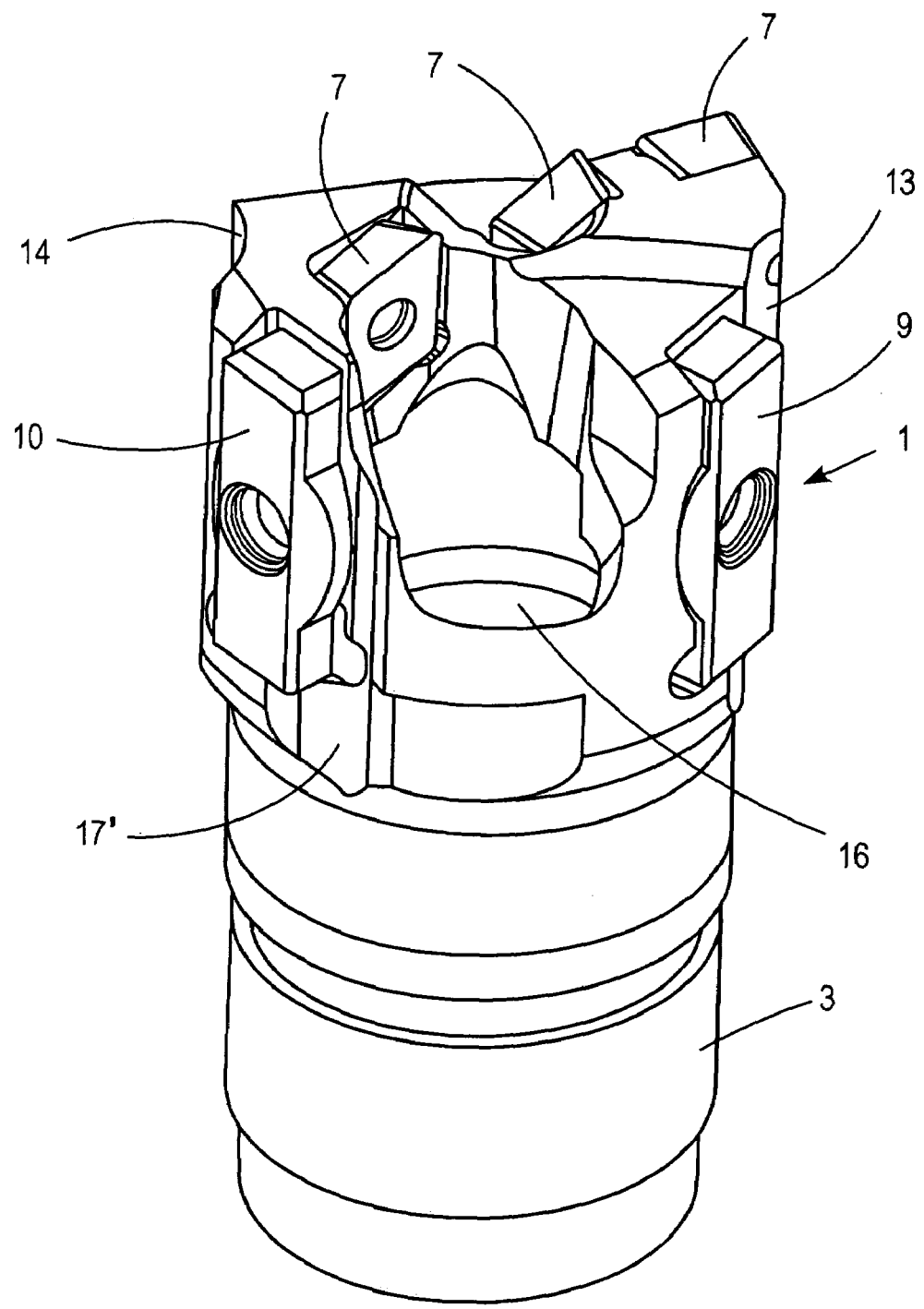
FIG. 1 shows a front view of a conventional long hole drill having a support pad according to the invention.
Figure 2:
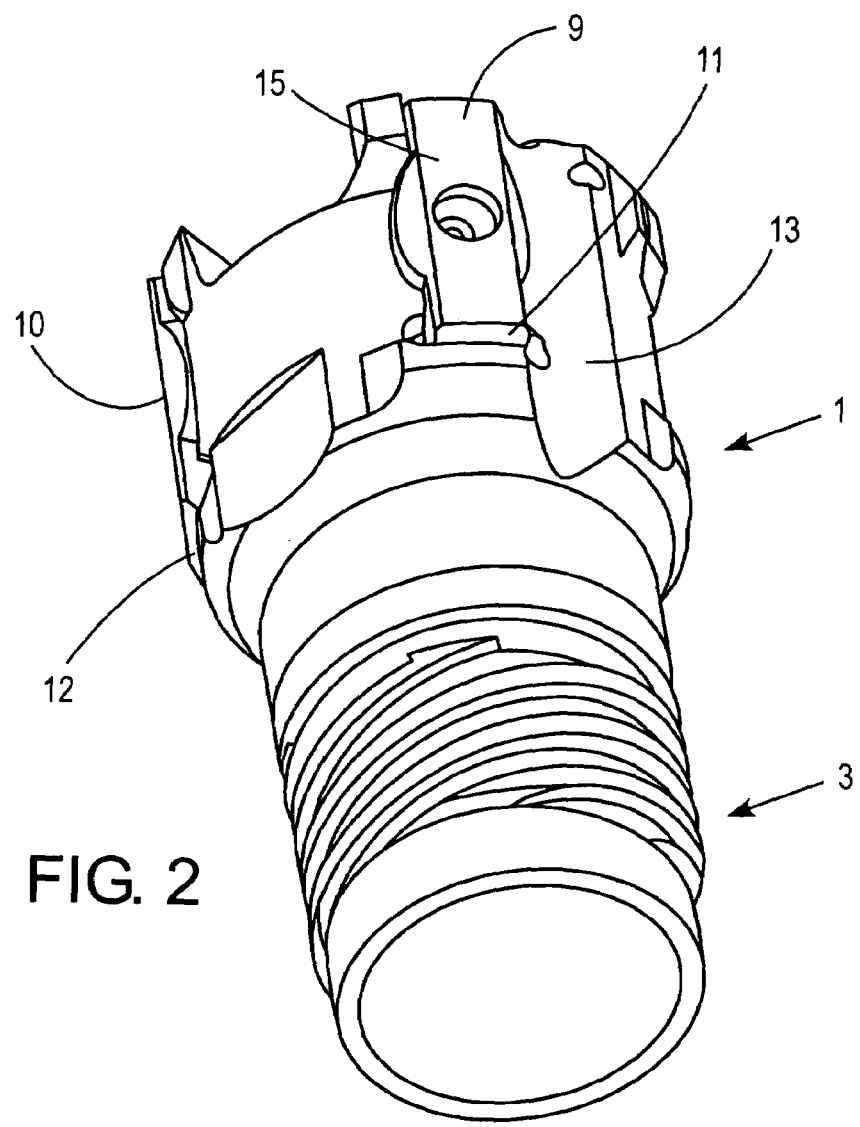
FIG. 2 shows a perspective view obliquely from below of the long hole drill according to FIG. 1.

The invention relates to a long hole drill 1 shown in FIG. 1. A long hole drill according to the present invention comprises a drill head body as well as an integral connecting part 3, which is equipped with a conventional external thread. The connecting part 3 is generally, via said external thread, connected to a drill tube (not shown), which in its turn is carried by a suitable support device. The drill head 1 is in the usual way provided with cutting inserts 7.

Figure 3:
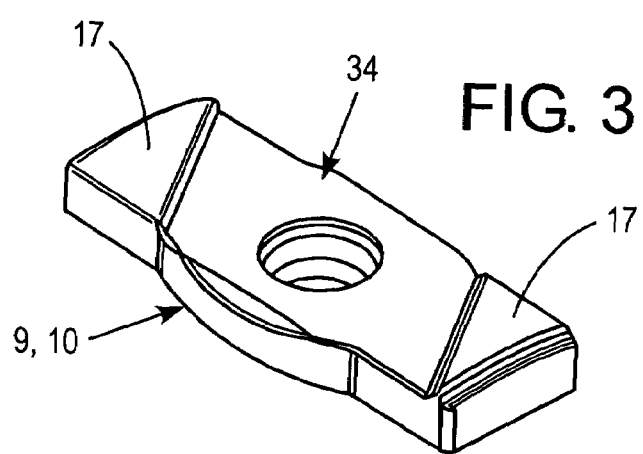
FIG. 3 shows a top perspective view of a support pad according to the invention having a somewhat modified shape.

The top wear surface 15 of the support pads could be planar, or provided with spaced raised lands 17 as shown in FIG. 3.

The drill head body 1 is in addition provided with pockets in which are mounted respective support pads 9 and 10, which in the shown embodiment comprise interchangeable units analogous to the indexable cutting insert principle. That is, by rotating the support pads by 180° they can be used in any of the pockets. The support pads 9 and 10 are provided with a chamfer 11, 12 at the end thereof facing towards the connecting part 3. In that connection the chamfers 11, 12 are so formed that their abutment against the drill head body 1 takes place without there being some difference in level between the chamfers 11, 12 and the portions of the drill head 1 which said chamfers 11, 12 abut against.

The drill head body 1 of the long hole drill according to the present invention is also provided with a first external cooling channel 13 and a second external cooling channel 14. These channels improve both lubrication and cooling.

Said cooling channels 13, 14 extend in the axial direction of the drill and they are preferably parallel with the axial direction of the long hole drill. In the embodiment shown the cooling channels 13, 14 are formed as concave recesses in the drill head body 1, the cooling channels having, when seen in cross section, a soft rounded bottom with a certain radius of curvature.

In the usual way the drill head body 1 is provided with an inside central channel 16, through which the major part of the produced the chips are discharged.

Figure 4:
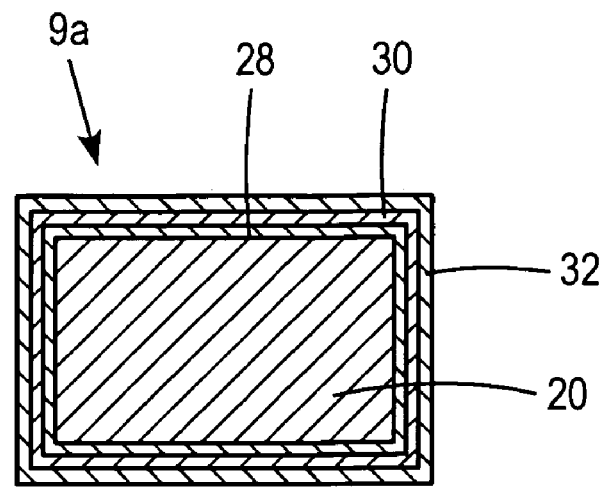
FIG. 4 shows a cross section through a prior art support pad.

Referring to FIG. 4, the preferred support pad is manufactured by applying an under coating 28 entirely around a substrate comprised of a basic body 20. The basic body 20 comprises cemented carbide with selected contents of WC, Co and cubic carbides TiC, TaC, NbC, depending upon the application. The under coating 28 is a titanium-containing coating of TiC or TiCN with a thickness of 2–4 µm. Applied entirely around the substrate comprised of the basic body 20 and the undercoating 28 is a titanium-free coating 30 comprising $Al_2O_3$ having a thickness of 2–5 µm, most preferably 3–5 µm. Then, applied entirely around the substrate comprised of the basic body 20 and the coatings 28, 30 is a titanium-containing coating 32 comprising TiN having a thickness of 0.5–2 µm. The coatings are deposited by conventional CVD or PVD deposition methods. The support pad shown in FIG. 4 has been heretofore made and used commercially.

Figure 5:
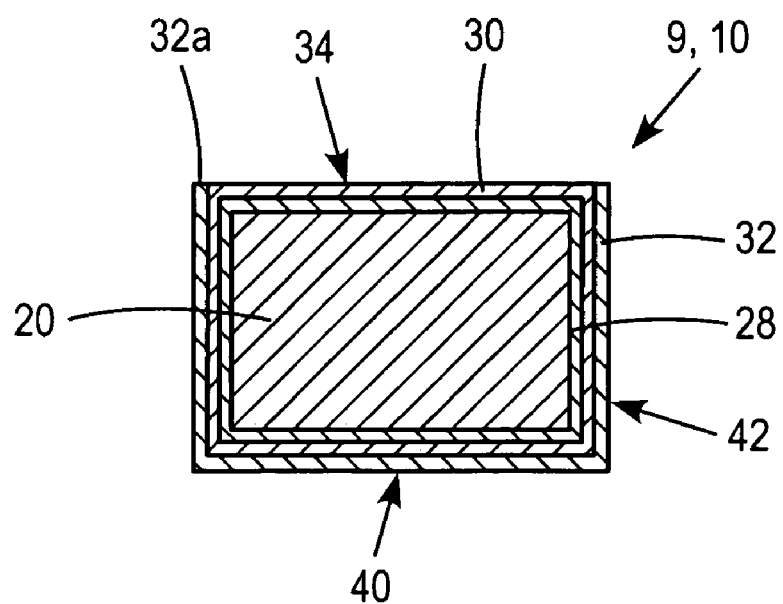
FIG. 5 is similar to FIG. 4, showing a support pad according to the present invention.

However, the item shown in FIG. 4 constitutes an intermediate element 9a in the pad-producing method. That is, according to the invention, a top portion of the titanium-containing coating 32 is removed, e.g., by blasting or machining, thereby exposing the top of the titanium-free coating 30, as shown in FIG. 5. Therefore, a top wear surface 34 of the support pad is defined by the titanium-free coating 24 (while surrounded by a very thin portion 32a of the titanium-containing coating 32 shown exaggeratedly in the figure).

Such a pad structure can be used on drills to drill long holes in any material, but improved pad life occurs especially when machining a titanium-based workpiece. That is, by removing the titanium-containing coating from the wear surface, i.e., from the surface that contacts the workpiece, a long hole can be drilled in a titanium-based workpiece without risk of the support surfaces of the support pad being adversely affected by the titanium of the workpiece. That is, titanium, by its nature has a tendency to bond with titanium. Thus, during the drilling of a long hole utilizing a drill whose support pads have a titanium-containing coating, would result in a bonding of the wear surface's titanium with that of the workpiece. Such "chemical" wear, in addition to the normal abrasive wear, would further shorten the life of the support pad.

Thus, the present invention provides a longer-life support pad without having to change the traditional, tried-and-tested manufacturing process described in connection with the making of the intermediate pad of FIG. 4, except to add the step of removing the top portion of the titanium containing coating.

Also, it will be easy for users to identify support pads made according to the invention, as well as their proper orientation on a drill, because the color of the exposed $Al_2O_3$ coating 30 at the wear surface (black) will be different from that of the bottom side 40 and the peripheral sides 42 of the support pad (yellow/gold).

Not only has the above-described support pad achieved advantages in the machining of titanium workpieces, but in other metals as well, due to the ability of the $Al_2O_3$ layer to act as a heat sink since it directly contacts the workpiece and can conduct away the heat to shield the underlying substrate against heat and diffusion ($Al_2O_3$ is a stable oxide. For example, in machining of a complex component made of nickel based alloy type INCO 718, long hole drilling occurred with a conventional TBT boring machine. One long hole drill head that was used that included a conventional support pad having an outer coating of TiN all around the support pad. With such a drill, drilling occurred at a speed of 80 RPM running with 15 M/min and a feed of 20 mm/min. With such machine, one component could be satisfactorily produced before the support pad had to be replaced. In contrast, when the same type of long hole drilling head was used equipped with a wear resistant coating according to the invention (e.g., the pad of FIG. 5), it was possible to produce two such components of complex shape of Inco 718 alloy until it became necessary to replace the support pad.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A support pad adapted for use on a long hole drill head, the support pad including a bottom support surface, a top wear surface, and a peripheral surface disposed between the support surface and the wear surface, wherein the support surface and the peripheral surface are defined by a titanium-containing wear-resistant coating, and the wear surface is defined by a titanium-free wear-resistant coating.

2. The support pad according to claim 1 wherein the support pad further comprises a cemented carbide basic body surrounded entirely by an under coating, with the titanium-free coating completely surrounding the under coating.

3. The support pad according to claim 2 wherein the under coating comprises titanium.

4. The support pad according to claim 1 wherein the titanium-containing coating has a different color than the titanium-free coating.

5. The support pad according to claim 4 wherein the titanium-free coating comprises $Al_2O_3$.

6. The support pad according to claim 5 wherein the titanium-free coating has a thickness of 2–5 µm.

7. The support pad according to claim 6 wherein the titanium-containing coating comprises TiN.

8. The support pad according to claim 7 wherein the titanium-containing coating has a thickness of 0.5–2 µm.

9. The support pad according to claim 4 wherein the titanium-containing coating comprises TiN.

10. The support pad according to claim 1 wherein the support pad is configured to be indexable upon being rotated by 180 degrees.

11. A support pad for use in a long hole drill head, the support pad comprising:
  a cemented carbide substrate;
  an undercoating encasing the substrate;
  a titanium-free wear-resistant coating encasing the substrate and undercoating; and
  a titanium-containing wear-resistant coating on a bottom surface and all peripheral surfaces so that a top surface retains the titanium-free wear-resistant coating as an exposed surface.

12. The support pad according to claim 11, wherein the undercoating comprises TiC or TiCN.

13. The support pad according to claim 11, wherein the titanium-free wear-resistant coating comprises $Al_2O_3$.

14. The support pad according to claim 11, wherein the titanium-containing wear-resistant coating comprises TiN.

15. The support pad according to claim 11, wherein the undercoating comprises titanium.

16. The support pad according to claim 11, wherein the titanium-containing coating has a different color than the titanium-free coating.

17. The support pad according to claim 16, wherein the titanium-free coating comprises $Al_2O_3$.

18. The support pad according to claim 17, wherein the titanium-free coating has a thickness of 2–5 microns.

19. The support pad according to claim 18, wherein the titanium-containing coating comprises TiN.

20. The support pad according to claim 19, wherein the titanium-containing coating has a thickness of 0.5–2 microns.

21. The support pad according to claim 16, wherein the titanium-containing coating comprises TiN.

22. The support pad according to claim 11, wherein the support pad is configured to be indexable upon being rotated by 180 degrees.

* * * * *